(12) United States Patent
Jones et al.

(10) Patent No.: US 11,920,499 B2
(45) Date of Patent: *Mar. 5, 2024

(54) GAS TURBINE ENGINE WITH IMPROVED VIGV SHIELDING

(71) Applicant: ROLLS-ROYCE plc, London (GB)

(72) Inventors: Geoffrey B Jones, Burton-on-Trent (GB); Edward J Spalton, Derby (GB); Duncan A Macdougall, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,807

(22) Filed: Mar. 17, 2023

(65) Prior Publication Data

US 2023/0220780 A1    Jul. 13, 2023

Related U.S. Application Data

(63) Continuation of application No. 17/514,977, filed on Oct. 29, 2021, now Pat. No. 11,634,993.

(30) Foreign Application Priority Data

Nov. 20, 2020   (GB) ...................................... 2018264

(51) Int. Cl.
*F01D 9/04* (2006.01)
*F01D 5/14* (2006.01)
(Continued)

(52) U.S. Cl.
CPC ............... *F01D 9/041* (2013.01); *F01D 9/04* (2013.01); *F01D 17/162* (2013.01); *F02C 7/042* (2013.01);
(Continued)

(58) Field of Classification Search
CPC ..... F02K 3/06; F02K 3/04; F02K 3/00; F02K 3/068; F05D 2260/40311; F05D 2220/32; F05D 2240/24; F05D 2250/51; F05D 2240/12; F05D 2240/121; F05D 2240/122; F05D 2240/14; F05D 2240/90; F05D 2220/323; F01D 1/02; F01D 17/162; F01D 5/143; F01D 5/145; F01D 9/041; F01D 9/04; F01D 25/02; F01D 5/14; F01D 25/28; F01D 5/142; F01D 9/02; F01D 9/06;
(Continued)

(56) References Cited

U.S. PATENT DOCUMENTS 10,458,247 B2   10/2019   Charbonnier et al.
10,519,798 B2   12/2019   Kennedy
(Continued)

OTHER PUBLICATIONS

Mar. 21, 2022 Extended Search Report issued in European Patent Application No. 21203636.2.

*Primary Examiner* — Eric J Zamora Alvarez
(74) *Attorney, Agent, or Firm* — Oliff PLC

(57) ABSTRACT

A gas turbine engine includes: a fan rotating about an engine main axis; a core duct; an engine core; an Engine Section Stator (ESS) including a plurality of ESS vanes and arranged in the core duct downstream of the fan; and a plurality of variable inlet guide vanes (VIGV) adapted to rotate about a pivot axis and arranged in the core duct downstream of the ESS. The VIGV vanes are arranged angularly rotated with respect to the ESS vanes such that the VIGVs are shielded by the ESS, thereby protecting the VIGVs from icing and from ice shedding from the ESS vanes.

20 Claims, 3 Drawing Sheets

(51) Int. Cl.
  *F01D 9/02*    (2006.01)
  *F01D 17/16*   (2006.01)
  *F01D 25/02*   (2006.01)
  *F02C 7/042*   (2006.01)
  *F02K 3/06*    (2006.01)
  *F04D 29/56*   (2006.01)

(52) U.S. Cl.
  CPC .... *F05D 2220/32* (2013.01); *F05D 2220/323* (2013.01); *F05D 2240/12* (2013.01)

(58) Field of Classification Search
  CPC ...... F04D 29/547; F04D 29/563; F02C 7/042; Y02T 50/60
  See application file for complete search history.

(56) References Cited

U.S. PATENT DOCUMENTS

| | | |
|---|---|---|
| 2010/0172747 A1 | 7/2010 | Clark et al. |
| 2020/0232392 A1 | 7/2020 | Bousfield |

# GAS TURBINE ENGINE WITH IMPROVED VIGV SHIELDING

CROSS-REFERENCE TO RELATED APPLICATIONS

This application is a continuation of U.S. application Ser. No. 17/514,977 filed Oct. 29, 2021, which claims the benefit of priority from UK Patent Application Number 2018264.8 filed on Nov. 20, 2020, the entire contents of which are incorporated herein by reference.

BACKGROUND

1. Field of the Disclosure

The present disclosure relates to a gas turbine engine and more particularly to a gas turbine engine including components, such as vanes, which may be subject to icing.

2. Description of the Related Art

Gas turbine engines are typically employed to power aircraft. A gas turbine engine generally comprises, in axial flow series from front to aft, a fan, a core and an exhaust nozzle. The core comprises one or more compressors, a combustor, and one or more turbines. An air intake is provided for the engine. Air entering the air intake is accelerated by the fan to produce two air flows: a first air flow (core engine flow) through a core duct into the compressor and a second air flow (bypass flow) to provide propulsive thrust. Air entering the compressor is compressed, mixed with fuel and then fed into the combustor, where combustion of the air/fuel mixture occurs. The high temperature and high energy exhaust fluids are then fed to the turbine, where the energy of the fluids is converted to mechanical energy to drive the compressor in rotation by suitable interconnecting shaft.

An Engine Section Stator (ESS) with a plurality of ESS vanes is generally provided at the inlet of the core duct. The ESS vanes guide the air flow entering the core duct. The ESS vanes may be structural, i.e. the ESS may be provided to support load between an inner and an outer casing member; or non-structural. Furthermore, Inlet Guide Vanes (IGVs) may be provided in the core duct downstream of the ESS vanes and upstream of the compressor to further guide the air flow entering the compressor inlet. IGVs may be variable (VIGVs), i.e. rotatable about a radial pivot, to adjust the airflow depending on different engine operation conditions.

In appropriate atmospheric conditions, icing of components may occur at any time when the engine is running, that is to say in use. This includes ground running, at idle or at higher engine speeds, as well as operation in flight. In such circumstances ice may build up on ESS vanes and IGVs. In particular, there is a risk of icing when the design of the engine is such that the fan imparts only a low temperature rise to the air, and to a lesser extent the risk is exacerbated by lower fan blade rotational speed, such as in large and medium geared gas turbine engines, and a reduced number of fan blades.

Ice attached to the surface of a vane may effectively change the geometry of the vane, such that oncoming flow is presented with a surface that is not to design specification, and add unnecessary weight. This may ultimately result in lower engine efficiency and/or performance. Furthermore, ice formed on the vanes can break away therefrom in a process known as "shedding", which can cause ice impacts that may damage downstream components of the engine, in particular rotating components of the engine. For example ice shed from the ESS vanes and/or (V)IGVs may strike and damage rotating downstream compressor blade rows.

Many systems have been developed in attempts to reduce the formation of ice on the vanes or to minimise the damage caused by shedding from the vanes.

Conventional anti-icing and de-icing systems use hot air, bled from the compressor and ducted to the areas of the engine requiring de-icing, or electrical heating of the parts concerned; sometimes a combination of the two is used. Other known systems have used ducted hot oil, microwaves or chemical de-icing means.

A disadvantage of known anti-icing and de-icing systems is that they require additional hardware, in the form of bleeds and ducting for hot air, or heating elements and their associated control systems, which add weight and complexity to the engine. In addition, the need for warmed and pressurised air, or for electrical power, is detrimental to the overall efficiency and performance of the engine.

The present disclosure seeks to provide a gas turbine engine with improved VIGV anti-icing capability that addresses the above issues and overcomes the disadvantages of the known techniques.

SUMMARY

Accordingly there is provided a gas turbine engine comprising a fan rotating about an engine main axis and generating a core airflow and a bypass airflow; a core duct, across which the core airflow flows; and an engine core. The engine core comprises a compressor for compressing the core airflow and comprising a plurality of stages, each stage comprising a row of rotor blades and a row of stator vanes, a first stage of said plurality of stages being arranged at an inlet of the compressor; combustion equipment; and a turbine connected to the compressor through a shaft. The gas turbine engine further comprises an Engine Section Stator (ESS) comprising a plurality of ESS vanes and arranged in the core duct downstream of the fan, each ESS vane comprising an ESS leading edge and an ESS trailing edge; and a plurality of variable inlet guide vanes (VIGV) adapted to rotate about a pivot axis and arranged in the core duct downstream of the ESS and upstream of the compressor, each variable inlet guide vanes (VIGV) comprising a VIGV leading edge and a VIGV trailing edge. A mid-span ESS leading edge point is arranged at a first radius from the engine main axis and a mid-span VIGV leading edge point is arranged at a second radius from the engine main axis, the mid-span ESS leading edge point being at an axial distance L from the mid-span VIGV leading edge point, wherein the ratio $\Delta R/L$ of a difference $\Delta R$ between the first radius and the second radius to the axial distance L is comprised between 0.23 and 0.70, preferably between 0.40 and 0.70, and wherein the VIGV vanes are arranged angularly rotated with respect to the ESS vanes such that first longitudinal planes passing through respective 70% span ESS leading edge points are rotated with respect to corresponding second longitudinal planes passing through respective 70% span VIGV pivot axis points by a rotation angle $\alpha$ comprised between 0.1° and 6°.

In embodiments, the rotation angle $\alpha$ may be comprised between 0.1° and 5°, or between 0.1° and 4°, or between 0.1° and 3°, or between 0.2° and 6°, or between 0.3° and 6°, or between 0.4° and 6°, or between 0.5° and 6°, or between 0.5° and 5°.

During flight through supercooled cloud, or ground operation in freezing fog, droplets of supercooled liquid water are ingested into the engine where they subsequently collide with rotating or stationary surfaces and can freeze into ice. For the engine core duct the primary accretion sites are the ESS vane leading edge and pressure surface, the VIGVs, the core splitter, and the low pressure compressor outer annulus line between the core splitter and the VIGVs.

The higher inertia of the droplets prevents them from turning as quickly as the aft around blades or vanes leading to regions immediately behind these blades or vanes where there is very low concentration of supercooled liquid water droplets.

The present inventors have discovered that VIGVs may be protected from icing by positioning the VIGVs with respect to the ESS vanes such that the VIGVs are located within these low droplet concentration regions (shielded by the ESS), thereby protecting the VIGVs from ice buildup.

Because the water droplets (that stick and form ice on the ESS or VIGV) are pushed radially outwards by the centrifugal force imparted by the fan, there is a concentrating effect towards the outer annulus line of the ESS and core inlet and therefore ice tends to form on outer span of ESS vanes and VIGVs, namely between 40% and 100% span. It is therefore important to arrange the radially outer part of the VIGVs such as to be shielded by the ESS.

In the present disclosure, upstream and downstream are with respect to the air flow through the compressor; and front and rear is with respect to the gas turbine engine, i.e. the fan being in the front and the turbine being in the rear of the engine.

As used herein, a longitudinal plane is a plane containing the engine main axis, or, in other words, passing through the engine main axis, and extending radially therefrom. In this light, the first and second longitudinal planes pass through the engine main axis.

The ESS may be arranged at an inlet of the core duct. The compressor may be arranged immediately downstream of the plurality of the VIGVs.

The axial distance L may be comprised between 80 mm and 650 mm, for example between 80 mm and 500 mm, or between 80 mm and 400 mm, or between 80 mm and 300 mm, or between 80 mm and 250 mm, or between 100 mm and 400 mm, or between 100 mm and 300 mm, or between 120 mm and 400 mm, or between 120 mm and 350 mm, or between 120 mm and 300 mm, or between 120 mm and 250 mm, or between 150 mm and 550 mm.

The difference ΔR may be comprised between 60 mm and 280 mm, for example between 60 mm and 260 mm, or between 60 mm and 240 mm, or between 60 mm and 230 mm, or between 70 mm and 280 mm, or between 70 mm and 260 mm, or between 70 mm and 240 mm, or between 70 mm and 230 mm, or between 75 mm and 280 mm, or between 75 mm and 260 mm, or between 75 mm and 240 mm, or between 75 mm and 230 mm.

The ESS may comprise 40 to 80 ESS vanes, preferably 40 to 60.

The VIGVs are in number of between 40 and 80, preferably between 40 and 60.

The gas turbine engine may comprise an equal number of ESS vanes and VIGVs.

The ESS leading edge may not extend linearly along a radial direction.

The pivot axis of the VIGVs may be substantially radial.

As the pivot axis of the VIGVs may extend along a radial direction, whereas the ESS leading edge may extend along a curved line, the angle between corresponding longitudinal planes passing through ESS leading edge points and VIGV pivot axis points at different span heights may vary along the span.

For example, at 90% span the rotation angle $\alpha 1$, i.e. the angle formed between longitudinal planes passing through respective 90% span ESS leading edge points and longitudinal planes passing through respective 90% span VIGV pivot axis points, may be less or greater than the rotation angle $\alpha$ at 70% span. For example the rotation angle $\alpha 1$ at 90% span may be less than the rotation angle $\alpha$ at 70% span and may be in the range 0.05° to 5°, for example in the range 0.2° to 5°, or in the range 0.2° to 4°. In alternative embodiments, the rotation angle $\alpha 1$ at 90% span may be greater than the rotation angle $\alpha$ at 70% span and may be in the range 0.2° to 6°, for example in the range 0.2° to 5°, or in the range 0.4° to 5°.

For example at 50% span the rotation angle $\alpha 2$, i.e. the angle formed between longitudinal planes passing through respective 50% span ESS leading edge points and longitudinal planes passing through respective 50% span VIGV pivot axis points, may be less or greater than the rotation angle $\alpha$ at 70% span. For example the rotation angle $\alpha 2$ at 50% span may be less than the rotation angle $\alpha$ at 70% span and may be in the range 0.05° to 5°. In alternative embodiments, the rotation angle $\alpha 2$ at 50% span may be greater than the rotation angle $\alpha$ at 70% span and may be in the range 0.2° to 6°

The gas turbine engine may further comprise a strut arranged in the core duct between the ESS and the VIGVs. For example, the gas turbine engine may comprise one or more struts. The one or more struts may be arranged in the core duct downstream of the ESS. The one or more struts may be arranged in the core duct upstream of the compressor, in particular upstream of the VIGVs. In embodiments comprising the one or more struts, the axial distance L may be comprised between 300 mm and 650 mm, for example between 350 mm and 650 mm, or between 400 mm and 650 mm, or between 450 mm and 650 mm, or between 300 mm and 600 mm, or between 350 mm and 600 mm, or between 400 mm and 600 mm, or between 450 mm and 600 mm, or between 300 mm and 550 mm, or between 350 mm and 550 mm, or between 400 mm and 550 mm. Moreover, the difference ΔR may be comprised between 100 mm and 280 mm, for example between 120 mm and 280 mm, or between 140 mm and 280 mm, or between 160 mm and 280 mm, or between 100 mm and 260 mm, or between 120 mm and 260 mm, or between 140 mm and 260 mm, or between 160 mm and 260 mm, or between 100 mm and 240 mm, or between 120 mm and 240 mm, or between 140 mm and 240 mm, or between 160 mm and 240 mm.

The compressor may be a first compressor, the turbine may be a first turbine, and the shaft may be a first shaft. The engine core may further comprise a second compressor downstream of the first compressor, a second turbine upstream of the first turbine, and a second shaft connecting the second turbine with the second compressor. Where more than one compressor are present, the first compressor may be the most upstream compressor in the core duct.

The disclosure may be particularly advantageous in large and medium geared gas turbine engines, wherein icing and ice shedding are of particular concern.

Accordingly, the gas turbine engine may further comprise a reduction gearbox that receives an input from the shaft and outputs drive to the fan so as to drive the fan at a lower rotational speed than the shaft.

The gearbox may have a reduction ratio comprised between 3.1 and 3.8, preferably between 3.1 and 3.7, more preferably between 3.2 and 3.6.

The gas turbine engine may feature a fan with a diameter comprised between 240 cm and 400 cm, preferably between 240 cm and 380 cm, preferably between 300 cm and 390 cm, more preferably between 330 cm and 380 cm, even more preferably between 335 cm and 360 cm.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e, the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e, the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
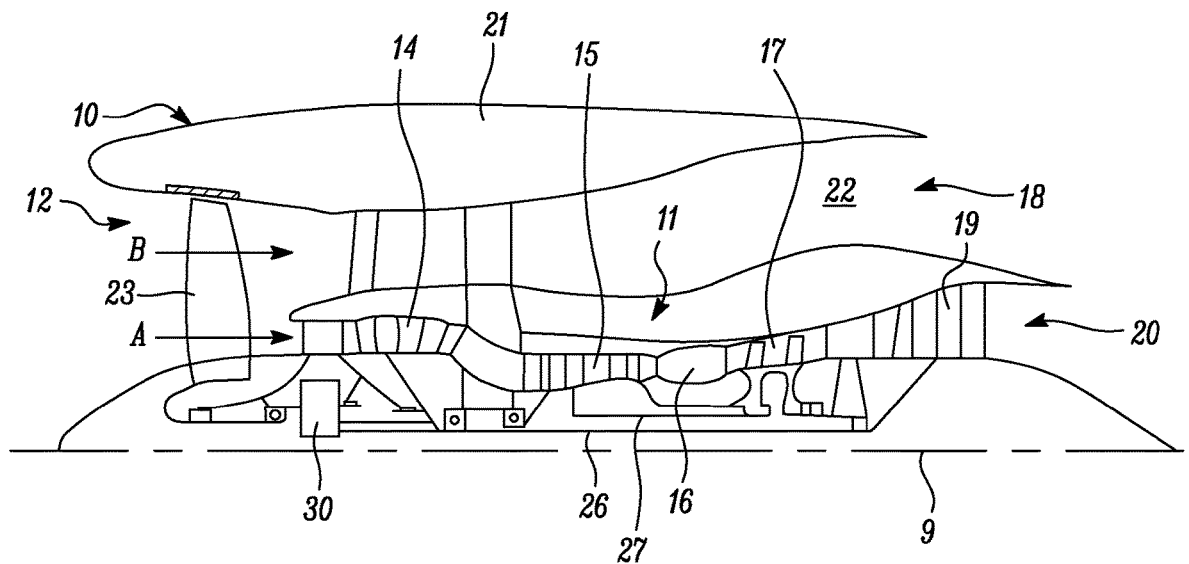
FIG. 1 is a sectional side view of a gas turbine engine.

FIG. 1 illustrates a gas turbine engine 10 having a principal rotational axis, or engine main axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30. In some arrangements, the gas turbine engine 10 may not comprise a gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
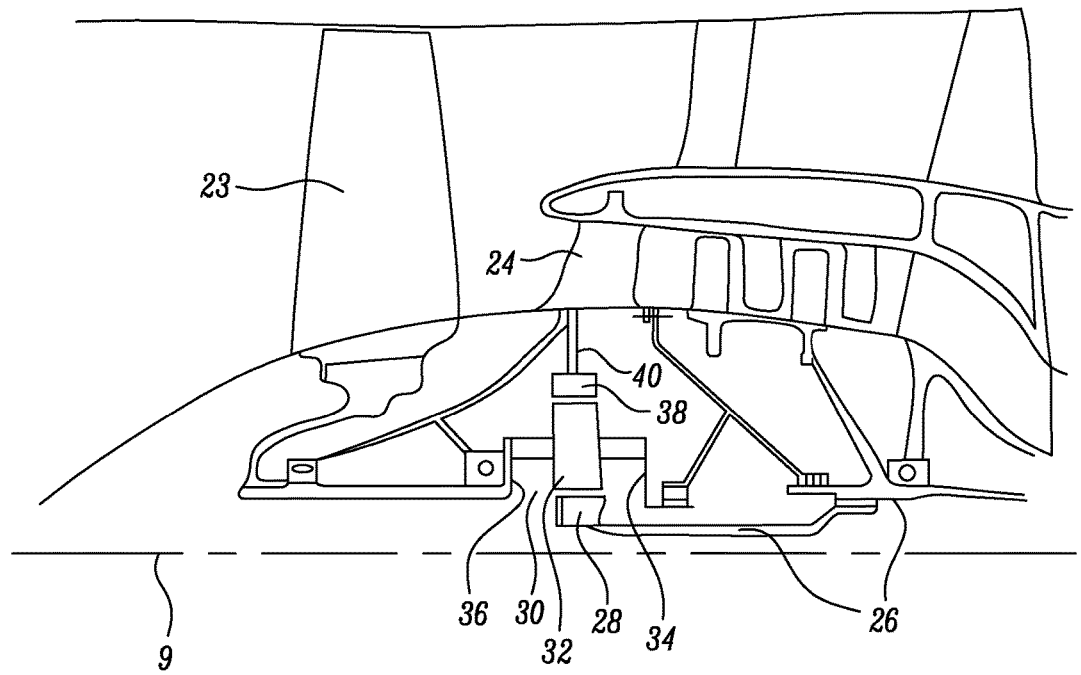
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
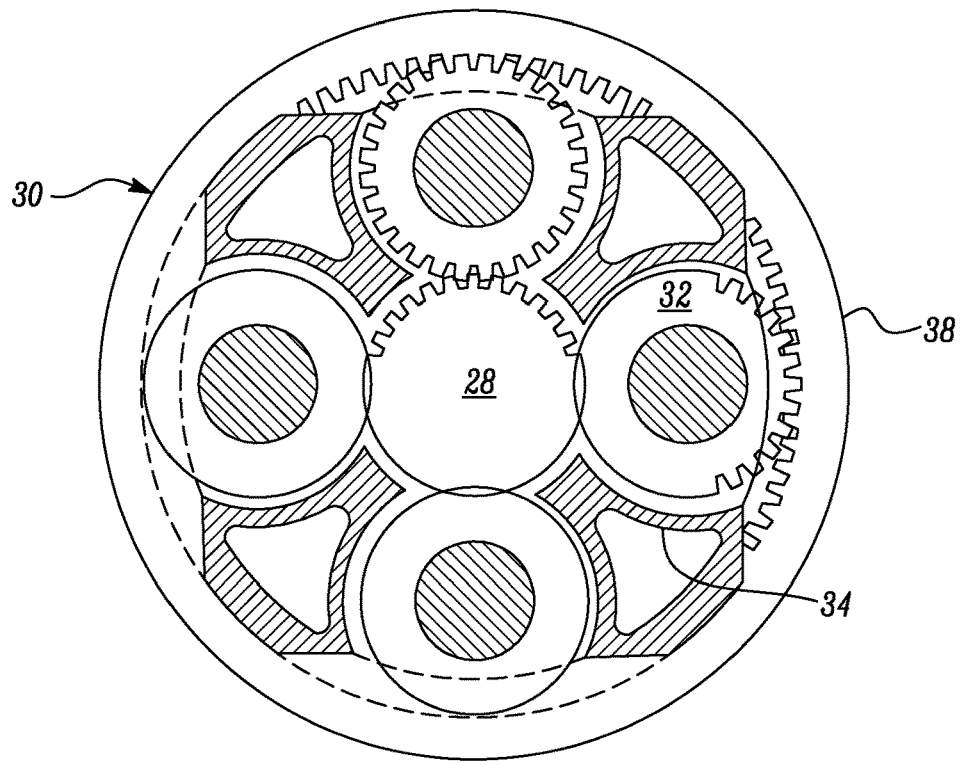
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
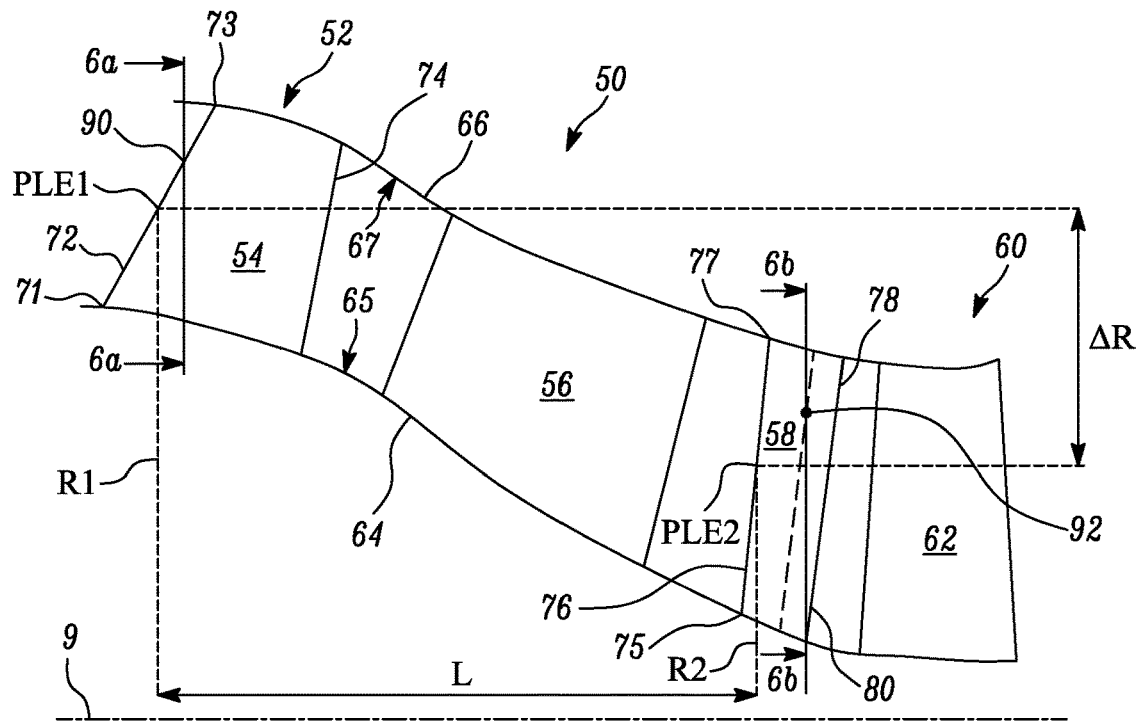
FIG. 4 is a longitudinal section of a core duct.

FIG. 4 illustrates an inlet duct 50 through which the core flow A enters the core 11 of the gas turbine engine 10. The inlet duct 50 is defined between an inner wall 64 and an outer wall 66 provided radially outwardly of the inner wall 64. An annular spacing between a radially outer surface 65 of the inner wall 64 and a radially inner surface 67 of the outer wall 66 defines the core duct which contains the core airflow A.

Arranged in the inlet duct 50, there are in flow series an Engine Section Stator (ESS) 52 with a plurality of vanes 54, a row of Variable Inlet Guide Vanes (VIGVs) 58, and a first rotor 60 of the low pressure compressor 14 with a plurality of first blades 62. Optionally, a strut 56 may be arranged in the inlet duct 50 between the ESS and the first rotor 60 of the low pressure compressor 14, for example between the ESS and the VIGVs 58. The strut 56 may be omitted in case the ESS is structural, i.e. if the ESS 52 is provided to support load between the inner wall 64 and the outer wall 66.

In general, the inner wall 64 and the outer wall 66 feature a curved profile and extend inwardly from the ESS 52 to the VIGVs 58 towards the engine main axis 9.

The ESS vanes 54 and the VIGVs direct the air entering the inlet duct 50 appropriately towards the compressor inlet, for example to improve the engine performance and avoid flow separation at the first blades 62.

The ESS vanes 54 are uniformly spaced circumferentially around the engine main axis 9 and have an aerofoil profile with an ESS leading edge 72 and an ESS trailing edge 74. The aerofoil profile extends in a chordwise direction from the leading edge to the trailing edge and in a spanwise direction from a first, radially inward end to a second, radially outward end. In this light, the ESS leading edge 72 extends from a first, radially inward, point 71 corresponding to 0% span to a second, radially outward, point 73 corresponding to 100% span. Point 71 may be referred to as 0% span ESS leading edge point 71 and point 73 as 100% span ESS leading edge point 73.

A mid-span ESS leading edge point PLE1 is defined on the ESS leading edge 72 at 50% span, midway between the inner wall 64 and the outer wall 66, or in other words midway between the 0% span ESS leading edge point 71 and the 100% span ESS leading edge point 73. The mid-span ESS leading edge point PLE1 is arranged at a first radius R1 from the engine main axis 9.

The VIGVs 58 are uniformly arranged circumferentially about the engine main axis 9 immediately upstream of the first rotor 60 of the low pressure compressor 14. The VIGVs 58 are rotatable about respective radial, or nearly radial, pivot axes 80, for example by means of a rotation mechanism per se known and therefore not illustrated in detail. In a typical arrangement each individual vane in a VIGV row is typically supported in two journal bearings at the radially inner and outer ends of the vane aerofoil section. The journal bearings permit the vane aerofoil to rotate or pivot about its spanwise axis. This axis is typically radial, or nearly radial, relative to the compressor or engine main axis 9.

The VIGVs 58 have an VIGV leading edge 76 and a VIGV trailing edge 78 and extend in a chordwise direction from the VIGV leading edge 76 to the VIGV trailing edge 78 and in a spanwise direction from a first, radially inward, end to a second, radially outward, end. In this light, the VIGV leading edge 76 extends from a first, radially inward point 75 corresponding to 0% span to a second, radially outward point 77 corresponding to 100% span. Point 75 may be referred to as 0% span VIGV leading edge point 75 and point 77 as 100% span VIGV leading edge point 77.

A mid-span VIGV leading edge point PLE2 is defined on the VIGV leading edge 76 at 50% span, midway between the inner wall 64 and the outer wall 66, or in other words midway between the 0% span VIGV leading edge point 75 and 100% span VIGV leading edge point 77. The mid-span VIGV leading edge point PLE2 is arranged at a second radius R2 from the engine main axis 9. The first radius R1 is generally greater than the second radius R2 and the difference ΔR between R1 and R2 is comprised between 60 mm and 280 mm, preferably between 150 mm and 260 mm. In an embodiment, the difference ΔR between R1 and R2 is for example 200 mm.

The mid-span ESS leading edge point PLE1 is axially distanced from the mid-span VIGV leading edge point PLE2 by an axial distance L. For example, the axial distance L is comprised between 300 mm and 650 mm, preferably between 450 mm and 650 mm. In an embodiment, the axial distance L is for example 500 mm. The ratio ΔR/L of the difference ΔR between the first radius R1 and the second radius R2 to the axial distance L is comprised between 0.23 and 0.70, preferably between 0.40 and 0.70. In an embodiment, the ratio ΔR/L is for example equal to 0.45.

The VIGVs 58 are arranged angularly rotated about the engine main axes 9 by a rotation angle α with respect to the ESS vanes 54, so that the VIGVs 58 are positioned in a shielded position with respect to the ESS vanes 54 to reduce water droplets contacting the VIGVs and therefore ice buildup. In particular, the VIGVs 58 are positioned such that a radially outer part of the VIGVs 58 is shielded. The radially outer part may be defined as the part of the VIGVs 58 between 40 and 100% span height.

The mutual arrangement of the ESS vanes 54 and VIGVs 58 will be further described with reference to FIGS. 5 and 6.

Figure 5:
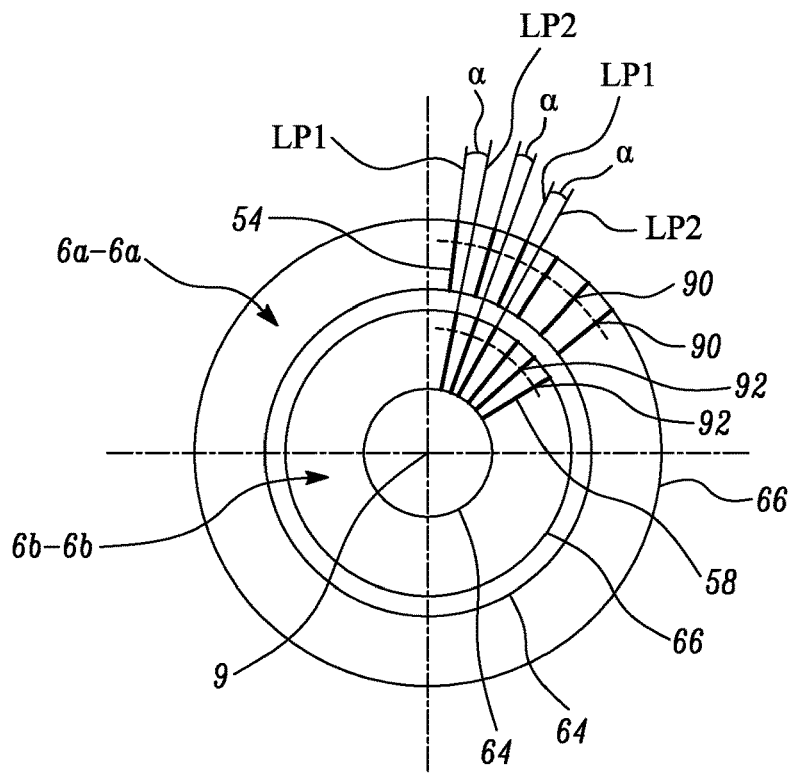
FIG. 5 is a schematic front view of the core duct taken along arrows 6a-6a and 6b-6b of FIG. 4 to show ESS vanes and VIGVs with respective first and second longitudinal planes and corresponding rotation angle.

FIG. 5 is a schematic, simplified front view of the inlet duct 50 taken along arrows 6a-6a and 6b-6b of FIG. 4 to show ESS vanes 54 and corresponding VIGVs 58. In substance, FIG. 5 shows a first cross-section 6a-6a taken at a first transversal plane passing through points 90 defined at 70% span on the ESS leading edge 72 and a second cross-section 6b-6b taken at a second transversal plane passing through points 92 defined at 70% span on the pivot axes 80. Points 90 may be referred to as 70% span ESS leading edge points 90 and points 92 as 70% span VIGV pivot axis points 92.

For sake of simplicity, not all of the ESS vanes 54 and VIGVs 58 of the core duct 50 have been illustrated.

FIG. 5 further illustrates first longitudinal planes LP1 passing through respective 70% span ESS leading edge points 90 and second longitudinal planes LP2 passing through respective 70% span VIGV pivot axis points 92.

The first longitudinal plane LP1 and second longitudinal plane LP2 pass through the engine main axis 9.

Each first longitudinal plane LP1 is angularly rotated with respect to a corresponding second longitudinal plane LP2 by the rotation angle α.

For each first longitudinal plane LP1 the corresponding second longitudinal plane LP2 is defined as the adjacent second longitudinal plane LP2 in a clockwise direction as seen from the front of the engine, namely as shown in FIG.

5. Similarly, for each ESS vane 54 a corresponding VIGV 58 is defined as the adjacent VIGV 58 in a clockwise direction as seen from the front of the engine.

The ESS vanes 54 and VIGVs 58 are in a same number comprised between 40 and 80, for example 48, or 54, or 60, and, as both the ESS vanes 54 and VIGVs 58 are uniformly angularly arranged about the engine main axis 9, for each pair of ESS vane 58 and corresponding VIGV 58 the rotation angle α is the same.

It has to be noted that the VIGVs 58 are rotatable about the respective pivot axes 80 and therefore the VIGV leading edge 76 moves with respect to the ESS leading edge 72, whereas the pivot axis 80 does not. Consequently, the mutual position of the ESS leading edge 72 and the pivot axis 80, for any span height, does not change, even if the VIGV rotates. In other words, the rotation angle α between the first longitudinal plane LP1 and the second longitudinal plane LP2 does not depend on the VIGV rotation and does not vary with the VIGV rotation about the pivot axis 80.

Furthermore, it has to be noted that the rotation angle between corresponding longitudinal planes passing through points at different span heights (i.e. at span heights different from 70%) on the ESS leading edge 72 and on the VIGV pivot axis 80 may vary with span height because of the generally 3D shape of the ESS vanes, and/or the non-perfectly radially orientation of the pivot axis 80, but not with VIGV rotation.

Figure 6:
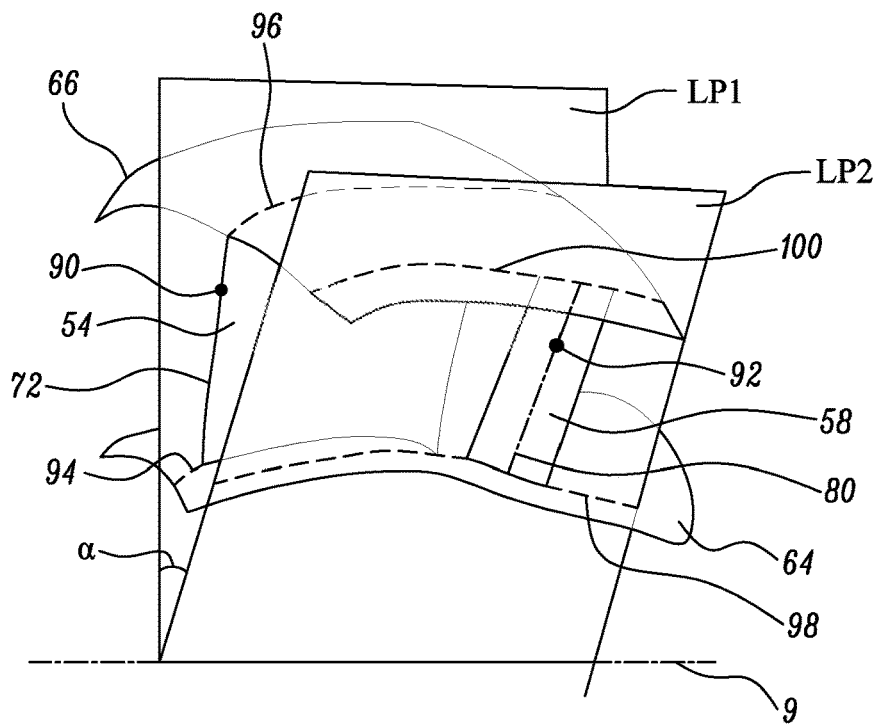
FIG. 6 is a schematic isometric view of the core duct with an ESS vane and a corresponding VIGV, showing a first longitudinal plane passing through a 70% span VIGV pivot axis point and a corresponding second longitudinal plane passing through a respective 70% span ESS leading edge point.

FIG. 6 shows an isometric view of a detail of an embodiment of the core duct 50 with an ESS vane 54 and a corresponding VIGV 58, arranged between the inner wall 64 and the outer wall 66. The embodiment of FIG. 6 does not comprise the strut 56.

FIG. 6 further shows the first longitudinal plane LP1 passing through the 70% span ESS leading edge point 90 of the ESS vane 54 and the second longitudinal plane LP2 passing through the 70% span VIGV pivot axis point 92 of the VIGV 58. The second longitudinal plane LP2 is rotated by the rotation angle α from the first longitudinal plane LP1 about the engine main axis 9 in a clockwise direction when seen from the front of the engine. In embodiments the rotation angle α is comprised between 0.1° and 6°, for example 2°, or 2.5°, or 3°.

The first longitudinal plane LP1 intersects the inner wall 64 along a first line 94 and the outer wall 66 along a second line 96. Both first and second lines 94, 96 are shown as dotted lines in FIG. 6.

The second longitudinal plane LP2 intersects the inner wall 64 along a third line 98 and the outer wall 66 along a fourth line 100. Both the third and fourth lines 98, 100 are shown as dotted lines in FIG. 6.

It will be understood that the invention is not limited to the embodiments above-described and various modifications and improvements can be made without departing from the scope of the invention as described in the appended claims. Except where mutually exclusive, any of the features may be employed separately or in combination with any other features and the disclosure extends to and includes all combinations and sub-combinations of one or more features described herein.

We claim:

1. A gas turbine engine comprising:
   a fan rotating about an engine main axis and generating a core airflow and a bypass airflow;
   a core duct, across which the core airflow flows;
   an engine core comprising:
      a compressor for compressing the core airflow and comprising a plurality of stages, each stage comprising a row of rotor blades and a row of stator vanes, a first stage of said plurality of stages being arranged at an inlet of the compressor;
      combustion equipment; and
      a turbine connected to the compressor through a shaft;
   an Engine Section Stator (ESS) comprising a plurality of ESS vanes and arranged in the core duct downstream of the fan, each ESS vane comprising an ESS leading edge and an ESS trailing edge; and
   a plurality of variable inlet guide vanes (VIGVs) adapted to rotate about a pivot axis and arranged in the core duct downstream of the ESS and upstream of the compressor, each of the plurality of variable inlet guide vanes (VIGVs) comprising a VIGV leading edge and a VIGV trailing edge, and
   wherein the plurality of VIGVs are arranged angularly rotated with respect to the plurality of ESS vanes such that first longitudinal planes passing through respective 70% span ESS leading edge points are angularly rotated with respect to corresponding second longitudinal planes passing through respective 70% span VIGV pivot axis points by a rotation angle α comprised between 0.1° and 6°.

2. The gas turbine engine of claim 1, further comprising a reduction gearbox that receives an input from the shaft and outputs drive to the fan so as to drive the fan at a lower rotational speed than the shaft.

3. The gas turbine engine of claim 2, wherein the gearbox has a reduction ratio comprised between 3 and 4.2.

4. The gas turbine engine of claim 1, wherein the pivot axis extends along a radial direction.

5. The gas turbine engine of claim 1, wherein the fan has a diameter in a range from 220 cm to 380 cm.

6. The gas turbine engine of claim 1, wherein the fan has a diameter in a range from 220 cm to 300 cm and is configured to have a rotational speed at cruise conditions in a range from 1700 rpm to 2500 rpm.

7. The gas turbine engine of claim 1, wherein the fan has a diameter in a range from 330 cm to 380 cm and is configured to have a rotational speed at cruise conditions in a range from 1200 rpm to 2000 rpm.

8. The gas turbine engine of claim 1, wherein a bypass ratio defined as a ratio of mass flow rate of the bypass airflow to mass flow rate of the core airflow at cruise conditions is in a range from 10 to 12.

9. The gas turbine engine of claim 1, wherein a bypass ratio defined as a ratio of mass flow rate of the bypass airflow to mass flow rate of the core airflow at cruise conditions is in a range from 13 to 15.

10. The gas turbine engine of claim 1, wherein the compressor is a first compressor, the turbine is a first turbine, and the shaft is a first shaft, the engine core further comprising a second compressor downstream of the first compressor, a second turbine upstream of the first turbine, and a second shaft connecting the second turbine with the second compressor.

11. A gas turbine engine comprising:
   a fan rotating about an engine main axis and generating a core airflow and a bypass airflow;
   a core duct, across which the core airflow flows;
   an engine core comprising:
      a compressor for compressing the core airflow and comprising a plurality of stages, each stage comprising a row of rotor blades and a row of stator vanes, a first stage of said plurality of stages being arranged at an inlet of the compressor;
      combustion equipment; and a turbine connected to the compressor through a shaft;

an Engine Section Stator (ESS) comprising a plurality of ESS vanes and arranged in the core duct downstream of the fan, each ESS vane comprising an ESS leading edge and an ESS trailing edge; and a plurality of variable inlet guide vanes (VIGVs) adapted to rotate about a pivot axis and arranged in the core duct downstream of the ESS and upstream of the compressor, each of the plurality of variable inlet guide vanes (VIGVs) comprising a VIGV leading edge and a VIGV trailing edge, and wherein the plurality of VIGVs are arranged angularly rotated with respect to the plurality of ESS vanes such that first longitudinal planes passing through respective 70% span ESS leading edge points are angularly rotated with respect to corresponding second longitudinal planes passing through respective 70% span VIGV pivot axis points by a rotation angle $\alpha$, and wherein the plurality of VIGVs are arranged angularly rotated with respect to the plurality of ESS vanes such that longitudinal planes passing through respective 90% span ESS leading edge points are angularly rotated with respect to corresponding longitudinal planes passing through respective 90% span VIGV pivot axis points by a rotation angle $\alpha 1$ less than the rotation angle $\alpha$ at 70% span and comprised between 0.05° and 5°.

12. The gas turbine engine of claim 11, wherein a mid-span ESS leading edge point is at an axial distance L from a mid-span VIGV leading edge point, the distance L being comprised between 80 mm and 650 mm.

13. The gas turbine engine of claim 11, further comprising a strut arranged in the core duct between the ESS and the plurality of VIGVs.

14. The gas turbine engine of claim 11, wherein the ESS comprises 40 to 80 ESS vanes.

15. A gas turbine engine comprising:
a fan rotating about an engine main axis and generating a core airflow and a bypass airflow;
a core duct, across which the core airflow flows;
an engine core comprising:
    a compressor for compressing the core airflow and comprising a plurality of stages, each stage comprising a row of rotor blades and a row of stator vanes, a first stage of said plurality of stages being arranged at an inlet of the compressor;
    combustion equipment; and
    a turbine connected to the compressor through a shaft;

an Engine Section Stator (ESS) comprising a plurality of ESS vanes and arranged in the core duct downstream of the fan, each ESS vane comprising an ESS leading edge and an ESS trailing edge; and a plurality of variable inlet guide vanes (VIGVs) adapted to rotate about a pivot axis and arranged in the core duct downstream of the ESS and upstream of the compressor, each of the plurality of variable inlet guide vanes (VIGVs) comprising a VIGV leading edge and a VIGV trailing edge, and wherein the plurality of VIGVs are arranged angularly rotated with respect to the plurality of ESS vanes such that first longitudinal planes passing through respective 70% span ESS leading edge points are angularly rotated with respect to corresponding second longitudinal planes passing through respective 70% span VIGV pivot axis points by a rotation angle $\alpha$, and wherein the plurality of VIGVs are arranged angularly rotated with respect to the plurality of ESS vanes such that longitudinal planes passing through respective 90% span ESS leading edge points are angularly rotated with respect to corresponding longitudinal planes passing through respective 90% span VIGV pivot axis points by a rotation angle $\alpha 1$ greater than the rotation angle $\alpha$ at 70% span and comprised between 0.02° and 6°.

16. The gas turbine engine of claim 15, further comprising a reduction gearbox that receives an input from the shaft and outputs drive to the fan so as to drive the fan at a lower rotational speed than the shaft.

17. The gas turbine engine of claim 16, wherein the reduction gearbox has a gear ratio in a range from 3.1 to 3.8.

18. The gas turbine engine of claim 15, wherein the engine is configured to have a Turbine Entry Temperature (TET) at cruise conditions in a range from 1400 K and 1650 K.

19. The gas turbine engine of claim 15, wherein the engine is configured to have a Turbine Entry Temperature (TET) at maximum take-off condition in a range from 1800 K and 1950 K.

20. The gas turbine engine of claim 15, wherein a mid-span ESS leading edge point is arranged at a first radius (R1) from the engine main axis and a mid-span VIGV leading edge point is arranged at a second radius (R2) from the engine main axis, wherein a difference $\Delta R$ between the first radius and the second radius is between 60 mm and 280 mm.

\* \* \* \* \*